US008605313B2

(12) United States Patent
Asai

(10) Patent No.: US 8,605,313 B2
(45) Date of Patent: Dec. 10, 2013

(54) COMMUNICATION SYSTEM, COMMUNICATION DEVICE, AND COMPUTER READABLE STORAGE MEDIA FOR INFORMATION DISPLAYING DEVICE AND FOR THE COMMUNICATION DEVICE

(75) Inventor: Norihiko Asai, Gifu (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 788 days.

(21) Appl. No.: 12/731,257

(22) Filed: Mar. 25, 2010

(65) Prior Publication Data

US 2011/0069340 A1 Mar. 24, 2011

(30) Foreign Application Priority Data

Sep. 24, 2009 (JP) ................................. 2009-219267

(51) Int. Cl.
*G06F 3/12* (2006.01)
*G06K 15/00* (2006.01)
(52) U.S. Cl.
USPC ......................................... 358/1.15; 358/1.14
(58) Field of Classification Search
None
See application file for complete search history.

(56) References Cited

U.S. PATENT DOCUMENTS

| | | | |
|---|---|---|---|
| 6,724,494 B1 | 4/2004 | Danknick | |
| 6,744,736 B1 | 6/2004 | Ito | |
| 6,989,907 B1* | 1/2006 | Jeyachandran et al. | 358/1.15 |
| 7,281,170 B2 | 10/2007 | Taylor et al. | |
| 7,647,534 B2 | 1/2010 | Castellani et al. | |
| 7,969,593 B2* | 6/2011 | Toda | 358/1.14 |
| 2002/0105671 A1 | 8/2002 | Sugahara | |
| 2003/0056140 A1 | 3/2003 | Taylor et al. | |
| 2003/0202202 A1* | 10/2003 | Miyata | 358/1.14 |
| 2011/0069340 A1 | 3/2011 | Asai | |

FOREIGN PATENT DOCUMENTS

| | | |
|---|---|---|
| JP | HEI 05-95355 A | 4/1993 |
| JP | 8-185300 A | 7/1996 |
| JP | 10-24644 | 1/1998 |
| JP | HEI 11-20277 A | 1/1999 |
| JP | HEI 11-119601 A | 4/1999 |

(Continued)

OTHER PUBLICATIONS

Notification of Reasons for Rejection dated Mar. 15, 2011 for Japanese Application No. 2009-097873 together with English language translation.

(Continued)

*Primary Examiner* — Thomas D Lee
*Assistant Examiner* — Neil R McLean
(74) *Attorney, Agent, or Firm* — Scully, Scott, Murphy & Presser, P.C.

(57) ABSTRACT

A communication system including a communication device, and a plurality of information displaying devices capable of receiving status information of a communication device is provided. Each information displaying device includes a first judging unit to judge whether the received status information includes error settling information, a first display unit to display the error information and an operable image when the judgment is made that the received status information lacks the error settling information, a first transmitter to transmit error settling information to the communication device in response to an operation to the operable image, and a display restrictor to restrict the error information from being displayed when judgment is made that the received status information includes the error settling information. The communication device includes a second transmitter to transmit at least the error information, and additionally with the error setting information.

13 Claims, 7 Drawing Sheets

(56) References Cited

FOREIGN PATENT DOCUMENTS

| | | |
|---|---|---|
| JP | 11-194918 A | 7/1999 |
| JP | HEI 11-205362 A | 7/1999 |
| JP | 2001-43038 | 2/2001 |
| JP | 2001-43054 A | 2/2001 |
| JP | 2002-209035 | 7/2002 |
| JP | 2003-91405 A | 3/2003 |
| JP | 2003-223523 A | 8/2003 |
| JP | 2004-005463 A | 1/2004 |
| JP | 2004-248256 | 9/2004 |
| JP | 2005-45551 A | 2/2005 |
| JP | 2005-236346 | 9/2005 |
| JP | 2006-13814 | 1/2006 |

OTHER PUBLICATIONS

U.S. Office Action dated Aug. 30, 2012, in related U.S. Appl. No. 12/731,234.

Notice of Allowance dated Jan. 28, 2013, in related U.S. Appl. No. 12/731,234.

* cited by examiner

| ERROR INFORMATION INDICATING CRITICAL ERROR | Out of paper<br>Paper jam<br>Out of ink (toner)<br>⋮ |
|---|---|

FIG. 4

| ERROR INFORMATION | ERROR-DEALING ACTION | FIXED COMMENT |
|---|---|---|
| Out of paper | NO | Press error-dealing button for error settlement |
| | YES | Error is handled by <x1> |
| Ink will run out soon | NO | Press error-dealing button for error settlement |
| | YES | Error-dealing button was pressed by <x2> Please wait |
| ⋮ | ⋮ | ⋮ |

FIG. 5

| ERROR INFORMATION | PARTICIPANT ID | ERROR-DEALING ANNOUNCEMENT DATE | ADDITIONAL COMMENT |
|---|---|---|---|
| Out of paper | 70a | 2009/09/10 13:00 | No paper in stock. I will fill the paper when arrives. |
| Ink will run out soon | 70c | 2009/09/10 17:00 | I will be gone on business trip next week. I will replace the ink cartridges within this week. |
| ... | ... | ... | ... |

101 — 102 — 103 — 104

ERROR SETTLING INFORMATION

FIG. 6

COMMUNICATION SYSTEM, COMMUNICATION DEVICE, AND COMPUTER READABLE STORAGE MEDIA FOR INFORMATION DISPLAYING DEVICE AND FOR THE COMMUNICATION DEVICE

CROSS REFERENCE TO RELATED APPLICATION

This application claims priority from Japanese Patent Application No. 2009-219267, filed on Sep. 24, 2009, the entire subject matter of which is incorporated herein by reference.

BACKGROUND

1. Technical Field

The following description relates to one or more techniques for establishing a communication system, in which a plurality of information displaying devices share a communication device, the communication device, and computer readable storage media for the information displaying devices and for the communication device.

2. Related Art

2. A system has been known, in which a multi-function peripheral (MFP) device having multiple functions (e.g., a printer function and a facsimile function) is connected with a plurality of user terminal devices via a LAN, so as to be utilized in common amongst the user terminal devices. In the system, when an error occurs in the MFP, information concerning the error is distributed to each of the user terminal devices.

SUMMARY

When an error occurs in the MFP, the error can be settled by any one of users who commonly use the MFP. However, since each of the user terminal devices receives the information concerning the error, two or more users may come up to the MFP in order to handle the error.

Aspects of the present invention are advantageous to provide one or more improved techniques which can avoid the aforementioned redundant situation and settle an error in an efficient fashion.

According to an aspect of the present invention, a communication system having a communication device, and a plurality of information displaying devices, each of which is connected with the communication device to communicate and capable of receiving status information of the communication device, is provided. Each of the information displaying devices includes a first judging unit to judge, when the status information transmitted from the communication device includes error information, which indicates an error condition in the communication device, as to whether the received status information includes error settling information associated with the error information, a first display unit to display the error information and an operable image representing an error-dealing button when the first judging unit judges that the received status information lacks the error settling information, a first transmitter to generate and transmit error settling information associated with the error information to the communication device in response to an operation to the operable image, and a display restrictor to restrict the error information from being displayed when the first judging unit judges that the received status information includes the error settling information. The communication device includes a storage unit to store the error settling information transmitted from the information displaying device to be associated with the error information, and a second transmitter to transmit at least the error information, and additionally with the error settling information when the error settling information is stored in the storage unit in association with the error information, to the plurality of information displaying devices.

According to another aspect of the present invention, a computer readable storage medium storing computer readable instructions to control an information displaying device, which has a display unit and is connected with a communication device to communicate and receive status information of the communication device, is provided. The computer readable instructions control the information displaying device to execute steps of judging, when the status information transmitted from the communication device includes error information, which indicates an error condition in the communication device, as to whether the received status information includes error settling information associated with the error information, displaying the error information and an operable image representing an error-dealing button when judgment is made that the received status information lacks the error settling information, generating and transmitting error settling information associated with the error information to the communication device in response to an operation to the operable image, and restricting the error information from being displayed when the judgment is made that the received status information includes the error settling information.

According to another aspect of the present invention, a communication device connected with a plurality of information displaying devices to communicate and capable of transmitting status information to the information displaying devices is provided. The communication device includes a receiver unit to receive from one of the information displaying devices, when the status information transmitted to the information displaying devices includes error information indicating an error condition in the communication device, error settling information associated with the error information, a storage unit to store the error settling information received from the information displaying device to be associated with the error information, and a transmitter to transmit at least the error information, and additionally with the error setting information when the error settling information is stored in the storage unit in association with the error information, to the plurality of information displaying devices.

According to another aspect of the present invention, a computer readable storage medium storing computer readable instructions to control a communication device, which is connected with a plurality of information displaying devices to communicate and capable of transmitting status information to the information displaying devices, is provided. The computer readable instructions control the communication device to execute steps of receiving from one of the information displaying devices, when the status information transmitted to the information displaying devices includes error information indicating an error condition in the communication device, error settling information associated with the error information, storing the error settling information received from the information displaying device in a storage unit to be associated with the error information, and transmitting at least the error information, and additionally with the error setting information when the error settling information is stored in the storage unit in association with the error information, to the plurality of information displaying devices.

BRIEF DESCRIPTION OF THE ACCOMPANYING DRAWINGS

FIG. 1 schematically shows a configuration of a multi-function peripheral (MFP) system in an embodiment according to one or more aspects of the present invention.

FIG. 4 illustrates a table to define critical errors which can be caused in the MFP according to the embodiments of the present invention.

FIG. 5 illustrates a table of fixed comments to be displayed in the PCs on basis of error information generated in the MFP according to the embodiment of the present invention.

FIG. 6 illustrates a table in which error information and error settling information are associated with each other in the MFP according to the embodiment of the present invention.

DETAILED DESCRIPTION

Hereinafter, an embodiment according to the present invention will be described with reference to the accompanying drawings.

Figure 1:
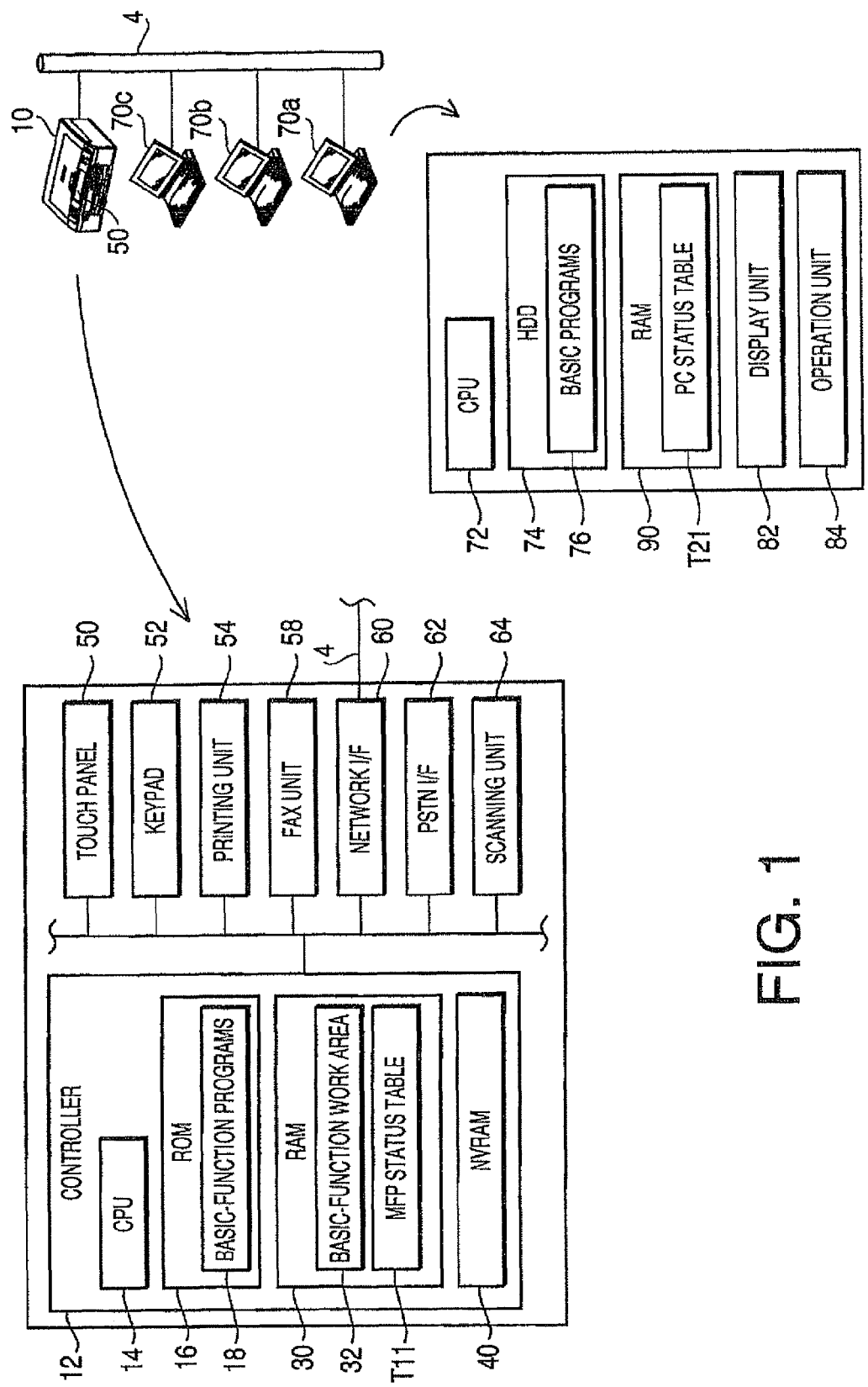

An overall configuration of a multi-function peripheral (MFP) system 2 according to the present embodiment will be described with reference to FIG. 1. The MFP system 2 includes MFPs 10a, 10b, 10c, PCs 70a, 70b, 70c, which are connected with one another through a LAN (local area network) 4 to communicate with one another. In the following description, the MFPs 10a, 10b, 10c, may be represented by "the MFP 70," and the PCs 70a, 70b, 70c may be represented by "the PC 70."

The MFPs 10a, 10b, 10c are in similar configuration, and description of those will be represented by that of the MFP 10a. The MFP 10a includes a controller 12, a touch panel 50, a keypad 52, a printing unit 54, a facsimile (FAX) unit 58, a network interface (I/F) 60, a PSTN interface 62, and a scanning unit 64. The network I/F 60 is linked with the LAN 4. The controller 12 includes a CPU 14, a ROM 16, a RAM 30, and an NVRAM 40.

The CPU 14 performs various operations in accordance with various programs that are stored on the ROM 16 and run on the RAM 30. Basic-function programs 18, stored on the ROM 16, are programs for controlling basic operations of the MFP 10a. For example, the basic-function programs 18 contain various control programs for storing time information and for controlling the printing unit 54, the facsimile unit 58, and the scanning unit 64.

The CPU 14 monitors status and conditions of the MFP 10 in real time. The information concerning the status and conditions of the MFP 10 is stored in a predetermined area (not shown) in the RAM 30 and transmitted to the PC 70 as status information in response to a periodic inquiry from the PC 70. The status information may include error information, which describes error conditions occurring in the MFP 10a, and operation status information, which describes progress of an operation being conducted in the MFP 10a. The error conditions to be indicated in the error information include, for example, a printing error concerning the printer unit 54, a facsimile error concerning the facsimile unit 58, and a scanning error concerning the scanning unit 64. The error information may indicate conditions, which are, for example, paper running out, paper jam, and ink running out. Further, the error information may indicate conditions, in which the user's attention is required, such as when an amount of remaining ink is small and when a date for periodic maintenance is coming. In these examples, the error information describing the small amount of remaining ink indicates an urgent condition which is to be handled immediately in order for the MFP 10a to accomplish the function thereof. In the present embodiment, the error information describing urgent error condition, which is to be handled immediately, can be referred to as critical error information. Meanwhile, the error information describing a less critical error condition, which may require the user's attention but may not necessarily be handled urgently, can be referred to as less critical error information.

The RAM 30 has a number of storage areas, which include a basic-function work area 32 and an area for an MFP status table T11. In the basic-function work area 32, various kinds of data created within the MFP 10 conducting operations according to the basic-function programs 18 is stored.

The status information includes contents indicating various types of status and conditions of operational events occurring in the MFP 10. The contents in the status information indicate, for example, an error condition occurring in the MFP 10 and progress of an operation being conducted in the MFP 10.

The MFP status table T11 is illustrated in FIG. 6. The MFP status table T11 stores error settling information, which includes information concerning participant ID <x1> 102, error-dealing announcement date <x2> 103, and additional comment 104 on basis of content of error information 101. Each of the contents in the error information 101 corresponds to an error code provided by the MFP 10a. The content of the error information 101 is described in a phrase including an error message, which corresponds to the error code. The phrases include, for example, "Out of paper" and "Ink will run out soon."

The error settling information including the participant ID <x1> 102, the error-dealing announcement date <x2> 103, and additional comment 104 is transmitted from the PC 70 when error information generated in the MFP 10a is transmitted to the PCs 70a, 70c, and the PC 70 responds to the error information.

The participant ID <x1> 102 indicates an identifier of one of the PCs 70a, 70b, 70c which responded to the error information and announced to handle the error. For example, when the PC 70a announces that the user of the PC 70a will handle an error condition "out of paper," an identifier of the PC 70a (i.e., 70a) is entered in a field for the participant ID <x1>102. When the PC 70c announces that the user of the PC 70c will handle an error condition "ink will run out soon," an identifier of the PC 70c (i.e., 70c) is entered in the field for the participant ID <x1> 102. The error-dealing announcement date <x2> 103 indicates a date, on which the PC 70 announces to handle the error condition. For example, date and time (e.g., 2009/09/10 13:00) are entered in the field for the error-dealing announcement date <x2>. The date of the error-dealing announcement may be defined as timing which can be associated with the error-dealing announcement, e.g., a time on which the user of the PC 70 enters the announcement (i.e., when an error-dealing button 202, which will be described later, is pressed), a time on which the PC 70 transmits the error settling information, and a time on which the MFP 10 receives the error settling information. The additional comment 104 indicates arbitrarily comment entered by the user of the PC 70 and received in the PC 70. The user can enter a message and sentences for the additional comment via the operation unit 84 of the PC 70.

In the present embodiment, character strings <x1> and <x2> in the participant ID <x1> 102 and the error-dealing announcement date <x2> 103 respectively represent variables for the participant ID and the error-dealing announcement date. As described below, when the variables <x1>, <x2> are included in prepared basic (fixed) comments, the variables are replaced with the contents of the participant ID <x1> 102, the error-dealing announcement date <x2> 103 in the MFP status table T11 to be displayed.

An overall configuration of the PC 70a will be described below. In the present embodiment, the PCs 70b and 70c are in similar configuration to that of the PC 70a; therefore, detailed description of the PCs 70b and 70c will be represented by that of the PC 70a. The PC 70a includes an HDD (hard disk drive) 74, a display unit 82, an operation unit 84, and a RAM 90. The display unit 82 displays various kinds of information to be viewed by the user. The operation unit 84 includes a keyboard and a mouse, which are handled by the user to enter various kinds of instructions and information in the PC 70a.

The HDD 74 has a number of storage areas including an area for basic programs. The basic programs 76 are programs for controlling basic operations of the PC 70a. As an example of the basic programs 76, a status monitor for the MFP 10 is cited. The status monitor is a program to inquire about operational status of the MFP 10 periodically to monitor the operational status and conditions of the MFP 10 to display in the display unit 82. Thus, the status and the conditions in the MFP 10 are monitored by the PC 70a at all time.

The RAM 90 has an area to store a PC status table T21 as illustrated in FIGS. 4 and 5. FIG. 4 illustrates a table defining error information to be determined as critical error information. Contents of the critical error information may include, for example, "out of paper," "paper jam," and "out of ink (toner)." In the present embodiment, error information which is not included in the PC status table T21 is considered to be less critical error information. Contents of the less critical error information may include, for example, "ink will run out soon," and "a date for periodic maintenance is coming." FIG. 5 illustrates a table containing fixed comments which are displayed in the display unit 82 of the PC 70 according to the error information. In the table shown in FIG. 5, the fixed comments to be displayed in the display unit 82 along with the content of the error information are prepared on basis of the content of the error information and on basis of an error-dealing action. For example, when an error condition is maintained untreated and no error-dealing action is taken, a fixed comment "Press error-dealing button for error settlement" may be displayed. When the error is handled by a participant and an error-dealing action has been taken, a fixed comment "Error is handled by <x1>" may be displayed. Alternatively, a fixed comment "Error-dealing button was pressed by <x2>. Please wait." may be displayed. When these fixed comments are displayed, the variables <x1>, <x2> are replaced with the contents in the participant IC <x1> 102 and the error-dealing announcement date <x2> 103 in the error settling information (see FIG. 6).

The table of fixed comments shown in FIG. 5 may be alternatively stored in the MFP status table T11 in place of the PC status table T21.

Figure 2:
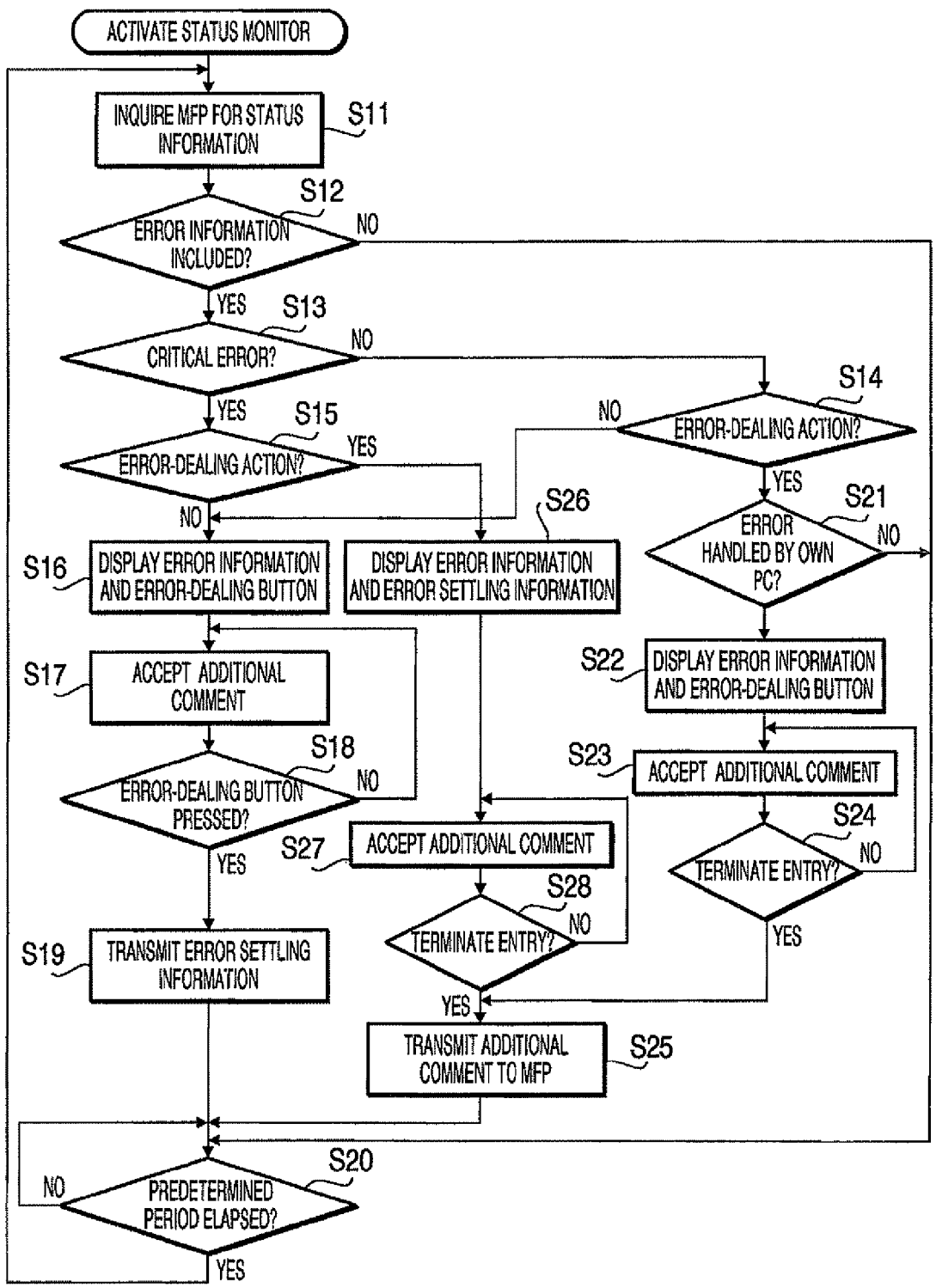
FIG. 2 is a flowchart to illustrate behaviors of a personal computer (PC) to display status information of an MFP in the MFP system according to the embodiment of the present invention.

Behaviors of the PC 70 in the multi-function system 2 according to the present embodiment will be described with reference to FIG. 2. FIG. 2 illustrates a flow of behaviors of the status monitor to be run on the PC 70a. The status monitor further monitors the behaviors of the MFP 10a.

When activated, the status monitor resides in the memory (e.g., the RAM 90) in the PC 70a to monitor the behaviors of the MFP 10a by repeating the operation flow shown in FIG. 2 until the PC 70a is powered off. When the flow starts, in 811, the status monitor inquires the MFP 10a about the status information. In S11, when the multi-function system 2 has other MFP 10 than the MFP 10a, the status monitor inquires all the MFPs 10 about the status information. Responses from the MFPs 10 are received in the PC 70a. In S12, it is examined as to whether the received status information includes error information. When no error information is included (S12: NO), the flow proceeds to S20, in which the status monitor pauses until a predetermined time period elapses (S20: NO).

In S12, when the error information is included in the status information (S12: YES), in S13, the status monitor judges as to whether the error information is critical error information. The judgment in S12 is made with reference to the table (see FIG. 4) defining the critical error and stored in the PC status table T21. If the error information does not indicate a critical error condition (S13: NO), the flow proceeds to S14. If the error information indicates a critical error condition (S13: YES), the flow proceeds to S15. In S14, the status monitor judges as to whether error-dealing announcement for the error condition indicated in the error information has been made by any user of the PC 70. In S15, the status monitor judges as to whether error-dealing announcement for the critical error condition indicated in the error information has been made by any user of the PC 70. These judgments are made by examining as to whether the status information received from the MFP 10a in S11 includes the error settling information associated with the current error information. If the error-dealing announcement has been made, the MFP 10a obtains the error settling information associated with the current error information from the table (see FIG. 6) stored in the MFP status table T11 containing the error information and the error settling information and transmits the error settling information along with the status information (S42, see FIG. 3) to be received by the PC 70a in S11. In S14, when the error-dealing announcement for the error condition has been made (S14: YES), the flow proceeds to S21. In S15, when the error-dealing announcement for the critical error condition has been made (S15: YES), the flow proceeds to S26.

Figure 7:
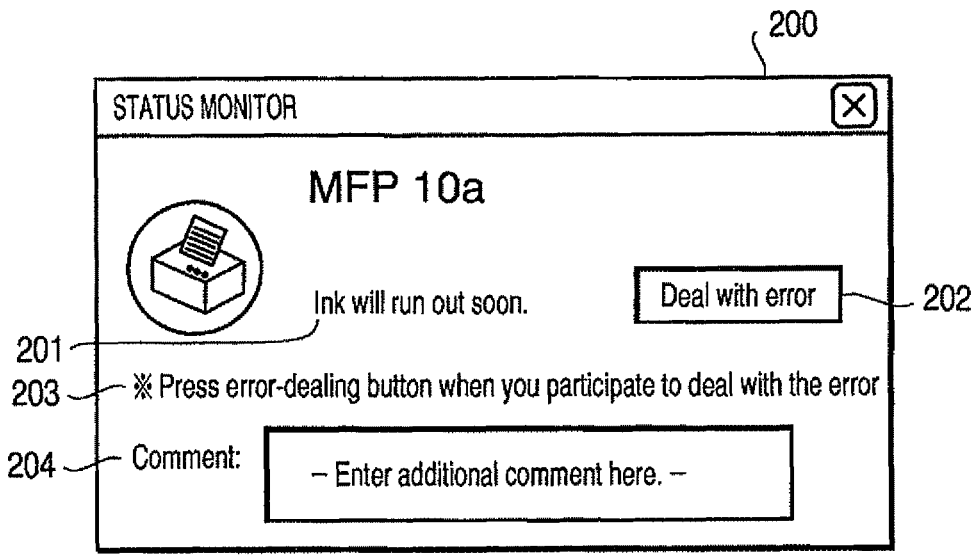
FIG. 7 is an illustrative view of a dialog box to be displayed in a display unit of the PC prior to error-dealing announcement according to the embodiment of the present invention.

In S14, if no error-dealing announcement has been made (S14: NO), the flow proceeds to S16. In S15, if no error-dealing announcement has been made (S15: NO), the flow also proceeds to S16. In S16, the status monitor displays a dialog box 200 (see FIG. 7) with the content of the error information and an error-dealing button. In the dialog box 200, the content of the error information 201 (i.e., "Ink will run out soon.") and the error-dealing button 202 are presented. The error-dealing button 202 is an operable image representing a button, which is presented to the user so that the user makes error-dealing announcement by operating the image (i.e., pressing the button). Further, the dialog box 200 presents a fixed comment 203, which describes "Press error-dealing button when you participate to deal with the error."

The fixed comment is prepared preliminarily for the error information to be obtained from the table (see FIG. 5) of the fixed comments, which is stored in the PC status table T21, and presented in the dialog box 200. In addition, a comment entry box 204 to allow the user to enter additional comment 104 is presented in the dialog box 200. Thus, the user is allowed to enter additional comment 104 in the comment entry box 204 in S17. In S18, the status monitor judges as to whether the error-dealing button 202 was pressed by the user regardless of the additional comment 104 having been entered in the comment entry box 204 or not. When the user presses the error-dealing button 202 (S18: YES), in S19, the status monitor generates and transmits error settling information to the MFP 10a. The error settling information to be transmitted in S19 includes information concerning the error-dealing announcement. In particular, for example, the error settling information includes an identifier (i.e., a participant ID 102) of the PC 70a, in which the error-dealing button 202 was pressed by the user, time (i.e., error-dealing announcement date 103) on which the error-dealing button 202 was pressed, and the additional comment 104 entered in the in the comment entry box 204 (if any).

In S13, if the error information does not indicate a critical error condition (S13: NO), and in S14, if the error-dealing announcement has been made for the error condition (S14: YES), in S21, the status monitor examines the error settling information received in S11 from the MFP 10a and judges as to whether the error-dealing announcement in the error settling information originates from by the PC 70a itself. In particular, for example, the status monitor examines the participant ID 102 included in the received error settling information coincides with the identifier of the PC 70a itself. If the two identifiers do not coincide (S21: NO), it is determined that the PC 70a has not made error-dealing announcement for the current error condition, and the error settling information received in S11 originates from the other PC 70 than the PC 70a itself. Therefore, no information display to draw the user's attention, which prompts the user to complete dealing with the error to settle, is necessary. The flow proceeds to S20, in which the status monitor does not display any attention-drawing information but waits until the predetermined time period elapses.

Figure 8:
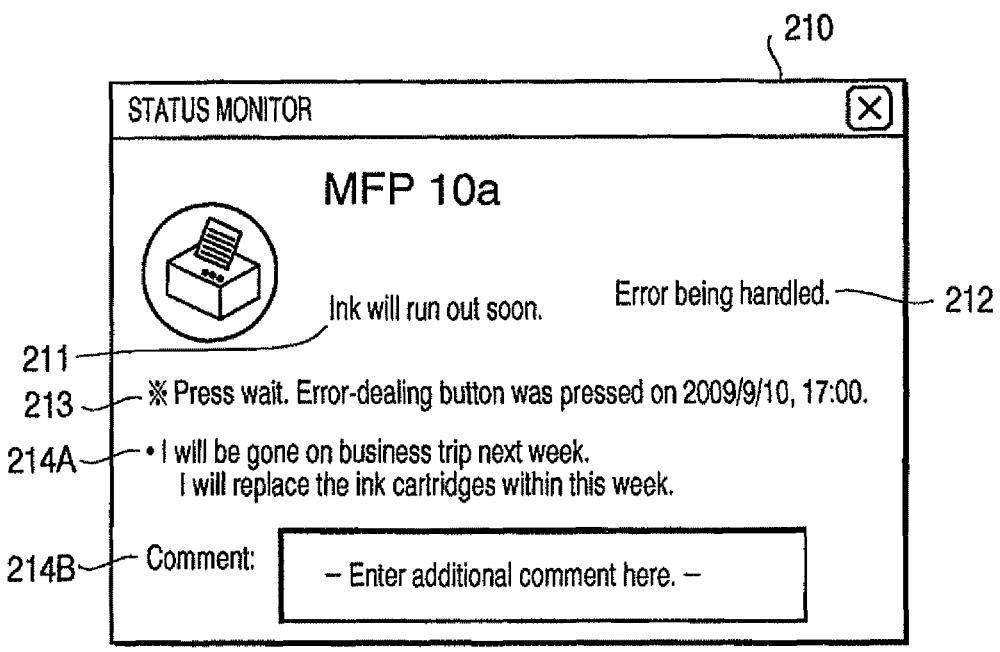
FIG. 8 is an illustrative view of a dialog box to be displayed in the display unit of the PC after the error-dealing announcement for a less critical error in the MFP according to the embodiment of the present invention.

In S21, if the two identifiers coincide (S21: YES), it is determined that the PC 70a is the origin which made the error-dealing announcement for the current error condition. In other words, display of the attention-drawing information in the display unit 82 of the PC 70a is effective for the user to settle the error. Therefore, in S22, the status monitor displays a dialog box 210 (see FIG. 8) presenting the content of the current error information and the error settling information in the display unit 82. FIG. 8 illustrates the dialog box 210 including the error settling information, which was transmitted to the MFP 10a in S19 in accordance with the information presented in the dialog box 200 (see FIG. 7). The dialog box 210 presents the content "Ink will run out soon." in the error information 211 and indication 212, which describes that the error is being handled. Further, a fixed comment 213 describing "Error-dealing button was pressed on 2009/09/10 17:00. Please wait," and an additional comment 214A describing "I will be gone on business trip next week. I will replace the ink cartridges within this week" are displayed. The fixed comment 213 ("Error-dealing button was pressed on <x2>. Please wait") is obtained from the table (see FIG. 5) of the fixed comments, which is stored in the PC status table T21, and presented in the dialog box 210. In this regard, upon display, the variable <x2> is replaced with the character string "2009/09/10 17:00," which is the error-dealing announcement date 103 in the error settling information. Further, the additional comment 214A is the content of the comment entered in the comment entry box 214 in S17. Furthermore, a comment entry box 21413 to enter additional comment 104 is presented so that the user is allowed to enter additional comment 104 in the comment entry box 214B in S23. In S24, the status monitor judges as to whether allowance of entry of the additional comment 104 in the comment entry box 214B is to be terminated. Regardless of the additional comment 104 having been entered in the comment entry box 204 or not, when the status monitor determines that the entry of the additional comment 104 is to be terminated (S24: YES), in S25, the status monitor terminates acceptance of the additional comment 104 and transmits the entered additional comment 104 (if any), which is to be included in the error settling information, to the MFP 10a.

Figure 9:
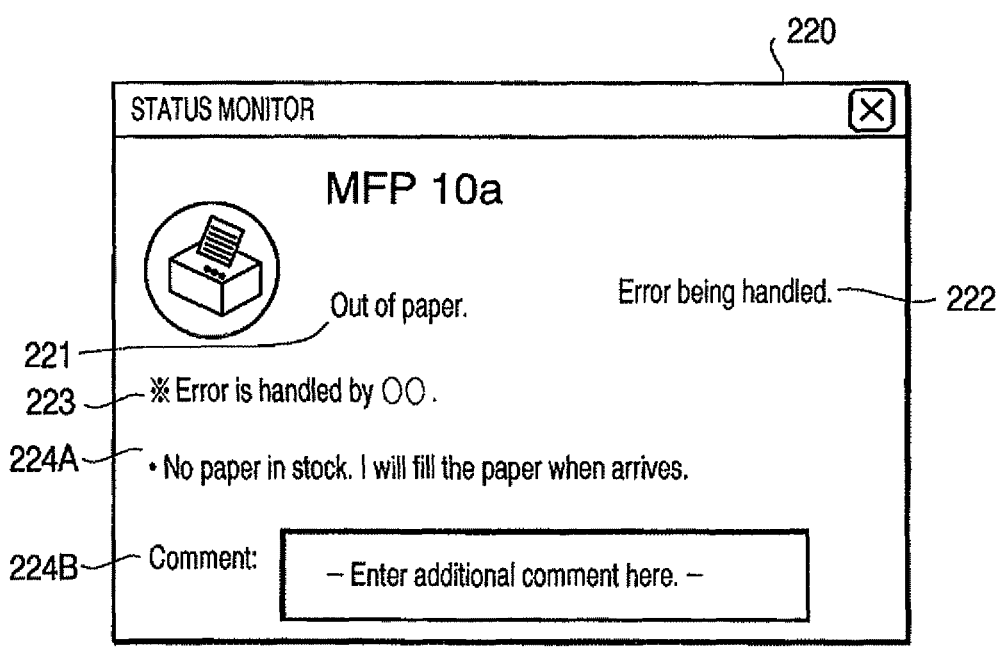
FIG. 9 is an illustrative view of a dialog box to be displayed in the display unit of the PC after the error-dealing announcement for a critical error in the MFP according to the embodiment of the present invention.

In S13, if the error information indicates a critical error condition (S13: YES), and in S15, if the error-dealing announcement has been made for the critical error condition (S15: YES), in S26, the status monitor the status monitor displays a dialog box 220 (see FIG. 9) with the content of the error information and the error settling information in the display unit 82 of the PC 70a. In the dialog box 220, the content of the error information 221 (i.e., "Out of paper.") and indication 222, which describes that the error is being handled, are presented. Further, a fixed comment 223 describing "Error is handled by" and an additional comment 224A describing "No paper in stock. I will fill the paper when arrives." are displayed. The fixed comment 223 ("Error is handled by <x1>.") is obtained from the table (see FIG. 5) stored in the PC status table T21 and presented with the variable <x1> being replaced with a name identified by the participant ID 102 in the error settling information. Furthermore, a comment entry box 224B to enter additional comment 104 is presented so that the user is allowed to enter additional comment 104 in the comment entry box 224B in S27. The additional comment 224A is content of a comment entered in the comment entry box 214B in S27 in a preceding status-monitoring operation by a user having the participant ID 102 which appears in the fixed comment 223. In S28, the status monitor judges as to whether allowance of entry of the additional comment 104 in the comment entry box 214B is to be terminated. Regardless of the additional comment 104 having been entered in the comment entry box 204 or not, when the status monitor determines that the entry of the additional comment 104 is to be terminated (S28: YES), in S25, the status monitor terminates acceptance of the additional comment 104 and transmits the entered additional comment 104 (if any), which is to be included in the error settling information, to the MFP 10a.

The dialog box 220 containing the critical error information is displayed in the display units 82 of all the PCs 70a, 70b, 70c in the multi-function system 2 in S26. Thus, updates of the error condition are distributed to all the users of the PCs 70a, 70b, 70c in the multi-function system 2. Further, the comment entry box 224B in the dialog box 220 provides the users with opportunities to announce error-dealing actions to the other users so that all the users are notified of the error-dealing actions having been taken effectively.

In the above operation flow, prior to the transmission of the additional comment 104 in S25, the status monitor may judge as to whether entry of the additional comment 104 is detected, so that the entered additional comment is transmitted to the MFP 10a when the entry is detected. When entry of the additional comment 104 is not detected, the transmitting behavior in S25 may be omitted.

In S20, the status monitor activates a timer, and when a predetermined time period elapses (520: YES), the flow returns to S11 and repeats the status-monitoring behaviors.

Figure 3:
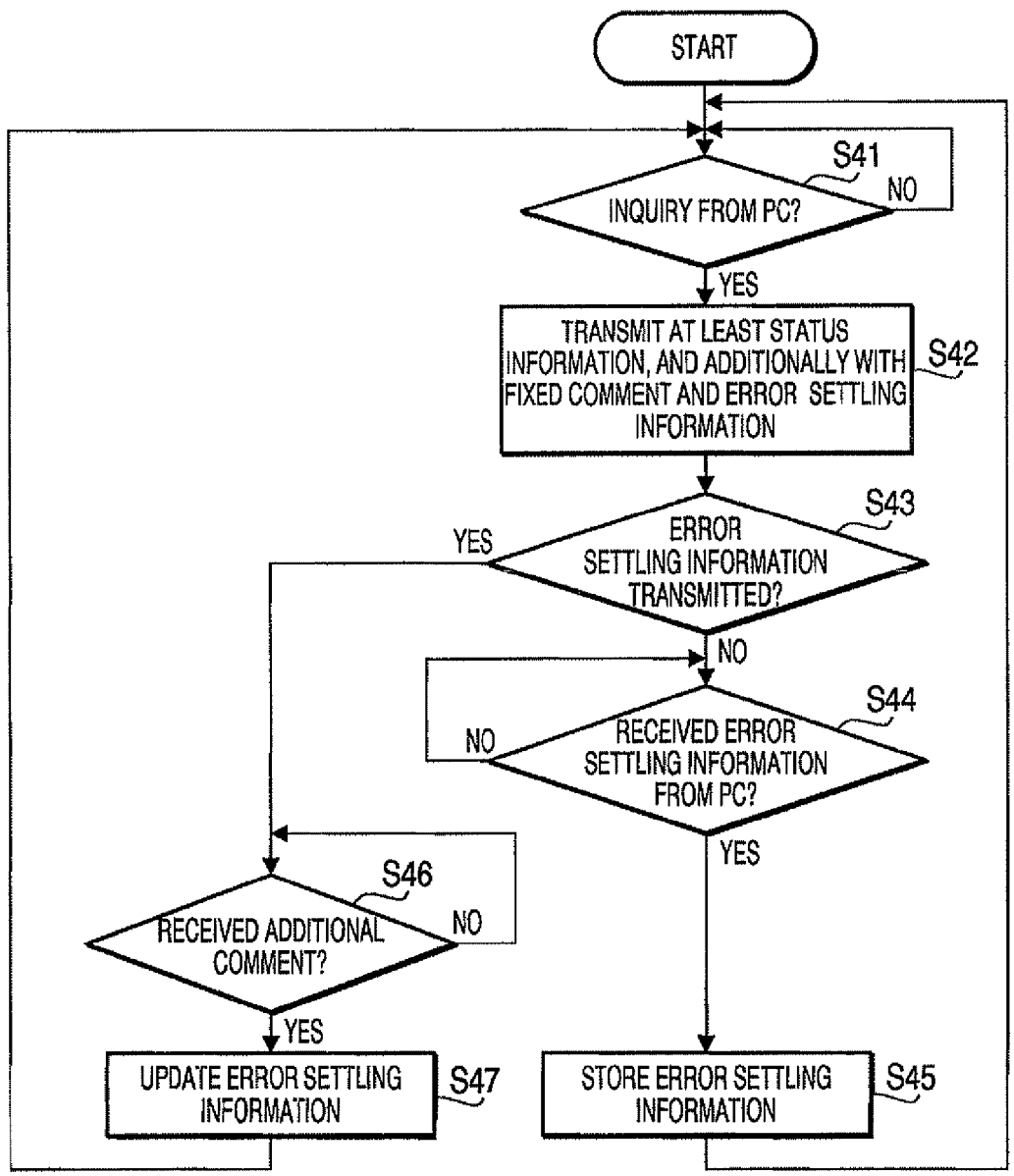
FIG. 3 is a flowchart to illustrate behaviors of the MFP to be monitored by the PC in the MFP system according to the embodiment of the present invention.

Next, behaviors of the MFP 10a in the multi-function system 2 according to the present embodiment will be described with reference to FIG. 3. FIG. 3 illustrates a flow of behaviors of the MFP 10a to be monitored by the status monitor in the PC 70a.

When the operation flow starts, in S41, the MFP 10a judges as to whether an inquiry from the PC 70a is received. When the inquiry is received (S41: YES), in S42, the MFP 10a transmits status information to the PC 70a. In 842, when the status information includes error information, the MFP 10a transmits the error information as well. Further, when error settling information corresponding to the error information is stored in the MFP status table T11, the MFP 10a obtains the error settling information and transmits the error settling information as well. If the error settling information is not stored in the MFP status table T11 (S43: NO), in S44, the MFP 10a waits for error settling information to be transmitted from the PC 70a. When no error settling information is received (S44: NO), the MFP 10a repeats S44. When the error settling information is received (S44: YES), in S45, the MFP 10a stores the received error settling information in the table (see FIG. 6) stored in the MFP status table T11, which contains the error information 101 and the error settling information to be associated with each other. In S43, if the MFP status table T11 stores the error settling information corresponding to the status information transmitted to the PC 70a in S42, i.e., the status information transmitted to the PC 70a in S42 included the error settling information (S43: YES), the flow proceeds to S46. In S46, the MFP 10a waits for the additional comment 104 to be transmitted from the PC 70a. When no additional comment 104 is received (S46: NO), the flow repeats S46. When the additional comment 104 is received (S46: YES), in S47, the MFP 10a stores the received additional comment 104 in the table (see FIG. 6) stored in the MFP status table T11, which contains the error information 101 and the error settling information to be associated with each other. Thus, the table in the MFP status table T11 is updated.

The above flow assumes that either the error settling information is transmitted from the PC 70a (S44: YES) or the additional comment 104 is transmitted from the PC 70a (S46: YES). However, the MFP 10a may receive an inquiry from the PC 70a whilst the MFP 10a is waiting for the error settling information (S44: NO) or the additional comment 104 (S46: NO). In order to handle such situation, the judgment in S41 may be made preferentially over the judgments in S44 and S46. That is, when the MFP 10a receives an inquiry from the PC 70a (S41:YES) whilst the MFP 10a is waiting for the error settling information (S44: NO) or the additional comment 104 (S46: NO), the MFP 10a may abort the judgment in S44 or S46, and the flow may proceed to S42.

When the MFP 10a recognizes the error is settled, the MFP 10a may remove the error information from the RAM 90 so that the error information describing the error condition having been settled is prevented from being included in the status information to be transmitted to the PC 70a. Further, the error settling information associated with the error information describing the settled error condition may be removed from the table (see FIG. 6) stored in the MFP status table T11 so that the error settling information associated with the settled error can be prevented from being transmitted in S42 (see FIG. 3).

According to the operations in the above embodiment, when the error information indicating an untreated error condition is obtained, the dialog box 200 (see FIG. 7) including the content of the error information 201 and the error-dealing button 202 is displayed so that the users viewing the dialog box 200 can participate in an error-dealing action and announce the participation in the error-dealing action. When the user presses the error-dealing button 202, the error settling information being in association with the error information, representing the participant ID 102 and the error-dealing announcement date 103, is transmitted to the MFP 10a to be stored in the MFP status table T11. Accordingly, the error conditions occurring in the MFPs 10 can be recognized on basis of the MFP 10, and the PCs 70 dealing with the error conditions can be identified on basis of the MFP 10.

When the error occurring in the MFP 10a is a less critical error, which does not necessarily require urgent error-dealing actions, and once error-dealing announcement is made, the subsequent error information is delivered solely to the PC 70a which announced the error-dealing action (S21: YES). As shown in the dialog box 210 (see FIG. 8), which is presented solely to the PC 70a having made the error-dealing announcement, the error information and the error settling information subsequent from the error-dealing announcement are delivered solely to the user of the PC 70a having made the error-dealing announcement. Accordingly, the attention-drawing indication can be effectively delivered to the user who participated in the error-dealing action.

Meanwhile, when the error occurring in the MFP 10a is a critical error, which requires urgent error-dealing actions, the error information and the error settling information, including the subsequent error information and the error settling information, are delivered to all the PCs 70 in the multi-function system 2. Accordingly, the attention-drawing indication for the urgent error-dealing actions can be effectively delivered to all the users.

According to the above embodiment, the fixed comments for the possible error conditions are prepared; therefore, effective messages can be delivered to the users along with the error information. Further, the PCs 70 can accept the additional arbitrary comments from the user so that the comments which may reflect personal circumstances of the users can be delivered to the other users.

Although an example of carrying out the invention has been described, those skilled in the art will appreciate that there are numerous variations and permutations of the a computer readable storage medium containing computer readable instructions, an information displaying device, and a communication device that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, the present invention may be similarly effectively applied to a communication system having solely one MFP 10.

In the above embodiment, the status and conditions of the MFP 10 are monitored by the PC 70; however, the PC 70 may monitor status and conditions of, for example, a printer device, a facsimile machine, a scanner device, and other communication device capable of communicating with the PC 70.

Further, in the above embodiment, communication within the multi-function system 2 is established on the basis of the LAN 4. However, a topology of the communication may not necessarily the LAN 4, as long as the devices within the multi-function system 2 are communicate with one another.

Furthermore, in the above embodiment, when one of the PCs 70 announces to handle the error condition in response to the error information, the identifier of the PC 70 is used as the participant ID <x1> 102 to be included in the error settling information. However, the user's personal ID may be used as the participant ID <x1> 102 when, for example, a plurality of users share a single PC 70.

What is claimed is:

1. A communication system comprising:
    a communication device; and
    a plurality of information displaying devices, each of which is connected with the communication device to communicate and capable of receiving status information of the communication device;
    wherein each of the information displaying devices comprises:
    a first judging unit configured to judge, when the status information transmitted from the communication device includes error information, which indicates an error condition in the communication device, as to whether the received status information includes error settling information associated with the error information, the error settling information including indications that an initial response for the error condition has been made and that the error condition remains unsettled;
    a first display unit configured to display the error information and an operable image representing an error-dealing button operable to create the error settling information, when the first judging unit judges that the received status information lacks the error settling information;
    a first transmitter configured to generate and transmit error settling information associated with the error information to the communication device in response to an operation to the operable image; and
    a display restrictor configured to restrict the error information from being displayed when the first judging unit judges that the received status information includes the error settling information;
    wherein when the error settling information is present in the status information received in the information display device, the first display unit is activated, and when the error settling information is not present in the status information received in the information display device, the display restrictor is activated;
    wherein the communication device comprises:
    a storage unit configured to store the error settling information transmitted from the information displaying device to be associated with the error information; and
    a second transmitter configured to transmit, to the plurality of information displaying devices the error information, and when the error settling information is created, to transmit and stored the error settling information in the storage unit in association with the error information.

2. The communication system according to claim 1,
    wherein each of the information displaying devices further comprises:
    a transmitter judging unit to judge, when the first judging unit judges that the received status information includes the error settling information, as to whether the error settling information included in the received status information originates from the own first transmitter; and
    a second display unit to display the error information when the transmitter judging unit judges that the error settling information included in the received status information originates from own first transmitter.

3. The communication system according to claim 2,
    wherein each of the information displaying devices further comprises:
    a second judging unit to judge an urgency level of the error information based on a predetermined criterion; and
    a third display unit to display the error information when the first judging unit judges that the received status information includes error settling information and the second judging unit judges that the error information indicates a higher-leveled urgency.

4. The communication system according to claim 3,
    wherein one of the first, second, and third display units is provided with a comment entry area, in which entry of an additional comment is accepted; and
    wherein each of the information displaying devices comprises a third transmitter, which transmits the additional comment accepted in the comment entry area to the communication device to be included in the error settling information when one of the second and the third display units is provided with the comment entry area.

5. The communication system according to claim 4,
    wherein one of the first, second, and third display units is provided with a first comment displaying area, in which at least the additional comment and additionally with a first basic comment are displayed, the additional comment being included in the error settling information and transmitted from the communication device to the information displaying device along with the error settling information, and the first basic comment being prepared on basis of content of the error information.

6. The communication system according to claim 4,
    wherein one of the second and third display units is provided with a second comment displaying area, in which at least the additional comment and additionally with a second basic comment are displayed, the additional comment being included in the error settling information and transmitted from the communication device to the information displaying device along with the error settling information, and the second basic comment being prepared on basis of content of the error information; and
    wherein at least a part of the second basic comment is replaced with the error settling information transmitted from the communication device.

7. The communication system according to claim 2,
    wherein the error settling information in the received status information includes an identifier of the information displaying device, of which operable image being displayed by the first display unit was operated; and
    wherein the transmitter judging unit compares an identifier of the information displaying device itself with the identifier included in the error settling information in order to determine that the error settling information included in the received status information originates from the own first transmitter of the information displaying device.

8. The communication system according to claim 1,
    wherein the error settling information stored in the storage unit of the communication device is deleted when the error condition indicated by the error information is settled.

9. The communication system according to claim 1,
    wherein each of the information displaying devices comprises a transmitter judging unit to judge, when the first judging unit judges that the received status information includes the error settling information, as to whether the error settling information included in the received status information originates from the own first transmitter; and
    wherein the display restrictor restricts the error information from being displayed when the transmitter judging unit judges that the received status information includes the error settling information originating from the first transmitter of a different one of the information displaying devices.

10. A non-transitory computer readable storage medium storing computer readable instructions to control an information displaying device, which has a display unit and is connected with a communication device to communicate and receive status information of the communication device, to execute steps of:

judging, when the status information transmitted from the communication device includes error information, which indicates an error condition in the communication device, as to whether the received status information includes error settling information associated with the error information, the error settling information including indications that an initial response for the error condition has been made and that the error condition remains unsettled;

displaying the error information and an operable image representing an error-dealing button, operable to create the error settling information, when judgment is made that the received status information lacks the error settling information;

generating and transmitting error settling information associated with the error information to the communication device in response to an operation to the operable image; and restricting the error information from being displayed when the judgment is made that the received status information includes the error settling information;

wherein when the error settling information is present in the status information received in the information display device, displaying is executed, and when the error settling information is not present in the status information received in the information display device, restricting is executed.

11. The computer readable storage medium according to claim 10, wherein the information displaying device further executes steps of:

judging an urgency level of the error information based on a predetermined criterion;

judging, when judgment is made that the error information indicates a lower-leveled urgency and that the received status information includes error settling information associated with the error information, as to whether the error settling information included in the received status information originates from the information displaying device itself;

one of displaying the error information, when judgment is made that the error settling information included in the received status information originates from the information displaying device itself, and restricting the error information from being displayed, when judgment is made that the error settling information included in the received status information originates from a different one of the information displaying devices; and displaying the error information when judgment is made that the received status information includes error settling information and that the error information indicates a higher-leveled urgency.

12. A communication device connected with a plurality of information displaying devices to communicate and capable of transmitting status information to the information displaying devices, comprising:

a receiver unit configured to receive from one of the information displaying devices, when the status information transmitted to the information displaying devices includes error information indicating an error condition in the communication device, error settling information associated with the error information, the error settling information including indications that an initial response for the error condition has been made, and that the error condition remains unsettled;

a storage unit configured to store the error settling information received from the information displaying device to be associated with the error information; and a transmitter configured to transmit, to the plurality of information displaying devices, the error information, and when the error settling information is created, to transmit and store the error settling information in the storage unit in association with the error information.

13. A non-transitory computer readable storage medium storing computer readable instructions to control a communication device, which is connected with a plurality of information displaying devices to communicate and capable of transmitting status information to the information displaying devices, to execute steps of:

receiving from one of the information displaying devices, when the status information transmitted to the information displaying devices includes error information indicating an error condition in the communication device, error settling information associated with the error information, the error settling information including indications that an initial response for the error condition has been made, and that the error condition remains unsettled;

storing the error settling information received from the information displaying device in a storage unit to be associated with the error information; and transmitting, to the plurality of information displaying devices, the error information, and, when the error settling information is created, transmitting and storing the error settling information in the storage unit in association with the error information.

* * * * *